United States Patent
Li et al.

(10) Patent No.: US 8,886,056 B2
(45) Date of Patent: Nov. 11, 2014

(54) APPARATUS FOR SELF-PHASE MODULATION NOISE CALCULATION, APPARATUS FOR SELF-PHASE MODULATION NOISE ELIMINATION AND OPTICAL COHERENT RECEIVER

(75) Inventors: Lei Li, Beijing (CN); Zhenning Tao, Beijing (CN); Takeshi Hoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 449 days.

(21) Appl. No.: 13/221,312

(22) Filed: Aug. 30, 2011

(65) Prior Publication Data

US 2012/0051742 A1 Mar. 1, 2012

(30) Foreign Application Priority Data

Aug. 31, 2010 (CN) .......................... 2010 1 0270816

(51) Int. Cl.
| | |
|---|---|
| *H04B 10/00* | (2013.01) |
| *H04B 10/255* | (2013.01) |
| *H04B 10/61* | (2013.01) |
| *H04B 10/079* | (2013.01) |

(52) U.S. Cl.
CPC .......... *H04B 10/0795* (2013.01); *H04B 10/255* (2013.01); *H04B 10/6163* (2013.01)
USPC .......................................... 398/208; 398/147

(58) Field of Classification Search
CPC ............. H04B 10/697–10/6973; H04B 10/255
USPC .................................. 398/208–211, 147, 159
See application file for complete search history.

(56) References Cited

U.S. PATENT DOCUMENTS

| 2006/0013589 A1* | 1/2006 | Odate et al. .................... 398/147 |
| 2009/0142077 A1* | 6/2009 | Taylor ............................ 398/208 |

OTHER PUBLICATIONS

Chinese Office Action mailed Apr. 1, 2014 in corresponding Chinese Application No. 201010270816.8.
Chinese Office Action issued May 27, 2014 in corresponding Chinese Patent Application No. 201010270816.8.

* cited by examiner

*Primary Examiner* — Leslie Pascal
(74) *Attorney, Agent, or Firm* — Staas & Halsey LLP

(57) ABSTRACT

The present invention provides apparatus for self-phase modulation noise calculation, apparatus for self-phase modulation noise elimination and optical coherent receiver. The apparatus for calculation comprises: a signal receiver to receive an input signal; a calculator connected to the signal receiver to calculate a self-phase modulation noise at the current instant by using the signal powers of an input signal waveform at the current instant and at several sampling instants adjacent to the current instant. The embodiments of the present invention calculates the self-phase modulation noise at a certain instant by using the signal powers at a plurality of digital sampling periods before and after this instant, and when the apparatus is used to calculate the self-phase modulation noise of each of the sub-spans in an optical fiber transmission link, in case that the calculation precision is ensured, the granularity of the sub-spans may be reduced, thereby lowering the complexity of the calculation.

10 Claims, 11 Drawing Sheets

US 8,886,056 B2

APPARATUS FOR SELF-PHASE MODULATION NOISE CALCULATION, APPARATUS FOR SELF-PHASE MODULATION NOISE ELIMINATION AND OPTICAL COHERENT RECEIVER

CROSS REFERENCE TO RELATED APPLICATIONS

This application claims the benefit of Chinese Application No. 201010270816.8, filed Aug. 31, 2010, the disclosure of which is incorporated herein by reference.

TECHNICAL FIELD

The present invention relates to the field of optical communications.

BACKGROUND OF THE INVENTION

The nonlinear noise of a fibre channel mainly comprises the self-phase modulation (SPM) noise caused by the fluctuations of the signal power of its own channel, and cross-phase modulation (XPM) noise caused by the fluctuations of the signals power of adjacent channels. For the self-phase modulation noise generated by a signal after being transmitted in a span of fiber, its numerical value may be calculated based on the power of the signal transmitted in this span of fiber. And for the self-phase modulation noise of the whole transmission link, due to the fiber dispersion in the transmission link, the power of the signal being transmitted changes along with the transmission distance, so it is necessary to divide the whole transmission link into multiple spans and seriatim calculate the corresponding span, with the calculation precision being dependent on the granularity of the spans. The finer the granularity is, the higher the precision of the calculation, but the higher the complexity of the calculation.

SUMMARY OF THE INVENTION

An aspect of the embodiments of the present invention provides apparatus for self-phase modulation noise calculation, comprising:

a signal receiver to receive an input signal;

a calculator connected to the signal receiver to calculate a self-phase modulation noise at the current instant by using the signal powers of an input signal waveform at the current instant and at several sampling instants adjacent to the current instant.

In the embodiments of the present invention, when a self-phase modulation is performed, it comprises the steps of: receiving an input signal; calculating a self-phase modulation noise at the current instant by using the signal powers of an input signal waveform at the current instant and at several sampling instants adjacent to the current instant. Thus, by combining and calculating signal powers at a plurality of sampling periods, in case that a certain precise is ensured, when the self-phase modulation noise of the input signal on an optical fiber transmission link is calculated by using the above-mentioned method, the granularity of the sub-spans may be relatively large, thereby reducing the calculation complexity of the self-phase modulation.

Another aspect of the embodiments of the present invention provides apparatus for self-phase modulation noise elimination, comprising:

a signal receiver to receive a baseband electric signal;

a noise eliminating unit to process the received baseband electric signal step by step to eliminate an adaptive modulation noise; wherein in each step of the processing, the signal powers, at the current instant and at several sampling instants adjacent to the current instant, of the electrically dispersion compensated signal waveform in current step, are used to calculate the self-phase modulation noise at the current instant and obtain the inverse number of the self-phase modulation noise, and the inverse number of the self-phase modulation noise is converted into a complex form, which is multiplied by the electrically dispersion compensated signal waveform in the current step to eliminate the self-phase modulation noise in the current step;

a signal transmitter to transmit the signal processed by the noise eliminating unit.

In the embodiments of the present invention, the following method is adopted to eliminate the self-phase modulation noise:

receiving a baseband electric signal;

processing the received baseband electric signal step by step to eliminate an adaptive modulation noise; wherein in each step of the processing, the signal powers, at the current instant and at several sampling instants adjacent to the current instant, of the electrically dispersion compensated signal waveform in current step, are used to calculate the self-phase modulation noise at the current instant and obtain the inverse number of the self-phase modulation noise, and the inverse number of the self-phase modulation noise is converted into a complex form, which is multiplied by the electrically dispersion compensated signal waveform in the current step to eliminate the self-phase modulation noise in the current step;

transmitting the signal of which the adaptive modulation noise is eliminated.

It can be seen from above that, by combining and calculating signal powers at a plurality of sampling periods, in the case that a certain precision is ensured, the cascade number of the electric dispersion compensation modules in the apparatus for self-phase modulation noise elimination may be reduced and the complexity of the hardware implementation of the apparatus for self-phase modulation noise elimination may be also reduced.

A further aspect of the embodiments of the present invention provides an optical coherent receiver, comprising the above apparatus for self-phase modulation noise elimination The advantages of the embodiments of the present invention exist in: when the apparatus for self-phase modulation noise calculation calculates the self-phase modulation at a certain instant, not only the signal power at this instant, but the signal powers at a plurality of digital sampling periods before and after the certain instant are also considered. In this way, when the apparatus is applied to the optical fiber transmission system shown in FIG. 1, by combining and calculating signal powers at a plurality of sampling periods, in case that a certain precision is ensured, the granularity of the sub-spans is made to be relatively large, thereby reducing the complexity of the calculation of the self-phase modulation; and when the apparatus is applied to the apparatus for self-phase modulation noise elimination, the cascade number of the electric dispersion compensation modules in the apparatus for self-phase modulation noise elimination is reduced and the complexity of the hardware implementation of the apparatus for self-phase modulation noise elimination is also reduced.

The particular embodiments of the present invention will be disclosed in detail with reference to the following description and drawings, indicating the principle of the present invention and the manners that may be adopted. It should be understood that the present invention is not limited to the embodiments, while many modifications, alternations and equivalences may be made to the embodiments of the present invention within the scope of the spirits and terms of the appended claims.

The characteristics described and/or shown with respect to one embodiment may also be used in one or more other embodiments in the same or similar way, may be combined with the characteristics in other embodiments, or may be used to replace the characteristics in other embodiments.

It should be stressed that the term "comprise/include" used herein refers to the existence of a characteristic, a set, a step, or an assembly, but does exclude the existence or addition of one or more of another characteristic, set, step, or assembly.

DETAILED DESCRIPTION OF THE INVENTION

Figure 1:
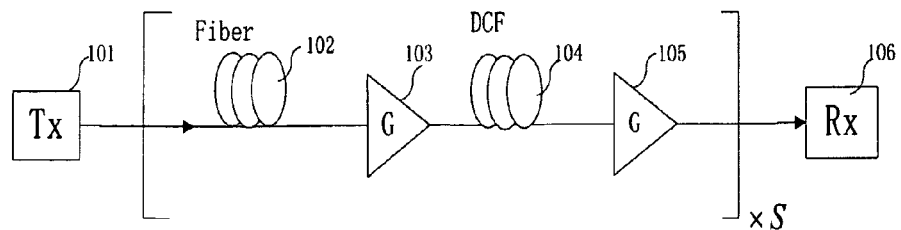
FIG. 1 is a schematic diagram of the structure of a typical optical fiber transmission system in the prior art.
Figure 2:
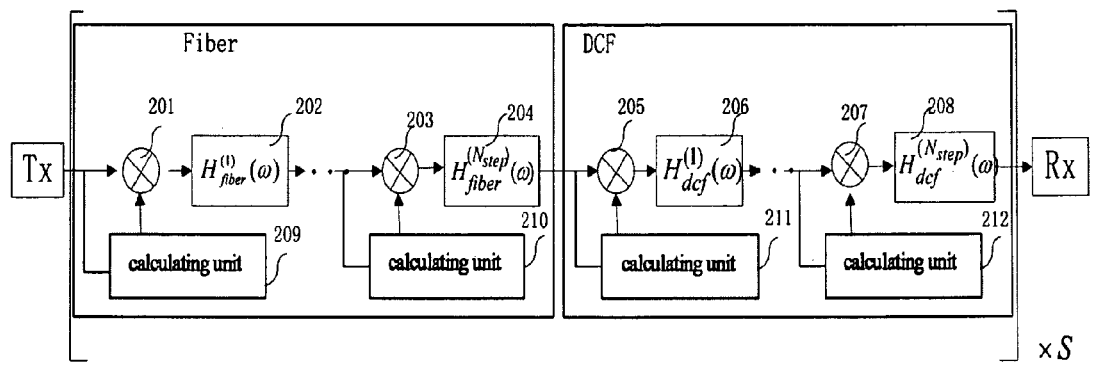
FIG. 2 is a schematic diagram of self-phase modulation in the prior art.

FIG. 1 is a schematic structural diagram of a typical fiber transmission system in the prior art, and FIG. 2 is a schematic diagram of self-phase modulation in the prior art. As shown in FIG. 1, the system comprises a fiber span concatenated using S spans, each span mainly comprising a span of fiber 102, an optical amplifier G 103, a dispersion compensation fiber (DCF) 104 and another optical amplifier G 105, wherein the system shown in FIG. 1 actually does not need the DCF 104 and the optical amplifier G 105 sometimes, and the configurations of the fibers in each span are not required to be identical. A signal will generate a self-phase modulation noise when it is transmitted in the fiber 102 and the DCF 104, and the self-phase modulation noise will interact with the dispersion to which the signal is subjected during transmission.

Due to the fiber dispersion in the transmission link, the power of the signal being transmitted changes along with the transmission distance, so it is necessary to divide the span of fiber 102 and the DCF 104 into a plurality of sub-spans in the transmission direction when calculating the self-phase modulation noise, with the interaction between the dispersion and the self-phase modulation within each of the sub-spans being ignored. As shown in FIG. 2, the span of fiber 102 and the DCF 104 are divided into N sub-spans in the transmission direction, the changes of the signal waveform with the dispersion may be calculated directly based on the dispersion coefficient, etc., such as being calculated by the dispersion calculating units $H_{fiber}^{(i)}(\omega)$ 202, 204 and 206, 208; the self-phase modulation within each of the sub-spans is obtained through the power of the signal waveform at the entrance of this sub-span multiplied by the nonlinear coefficient ($\gamma_{NL,fiber}$ or $\gamma_{NL,dcf}$) of the fiber, which is then converted into a complex form, such as being calculated by the calculating units 209, 210, 211 and 212; the self-phase modulation noise in a complex form obtained in each sub-span is sent to the multipliers 201, 203, 205 and 207 shown in FIG. 2, and then transmitted to the next sub-span by a dispersion compensation unit in this sub-span after being multiplied by the signal waveform at the entrance of this sub-span. Wherein, the self-phase modulation noise calculated by the calculating units 209, 210, 211 and 212 is expressed by the formula $e^{j\gamma_{NL}^{i}|s(t)|^2}$, where, $\gamma_{NL}^{i}$ is the nonlinear coefficient of the fiber, s(t) is the signal waveform at a certain instant, $|s(t)|^2$ is the signal power at a certain instant obtained after the signal waveform being performed a modulo operation and squared, and i represents the i-th span, which is a positive integer, and $1 \le i \le N$.

When self-phase modulation noise is calculated using the above formula, since the interaction between the self-phase modulation and the dispersion within each of the sub-spans is ignored, fine granularity of the sub-spans is needed to ensure the precision of the calculation, and the higher precision of the calculation is, the higher the complexity of the calculation.

In addition, the precision of the calculation may also be improved by using the waveforms (or their average value) at different positions of the sub-spans, or the information of adjacent transmission channels.

Figure 3:
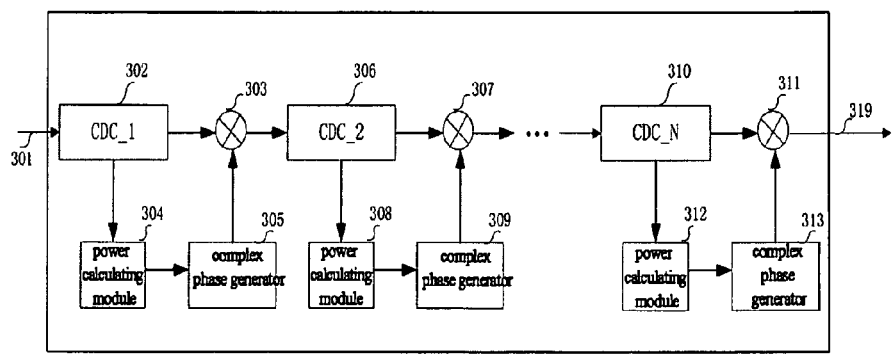
FIG. 3 is a schematic diagram of an apparatus for self-phase modulation noise elimination in a single-polarization optical coherent receiver in the prior art.
Figure 4:
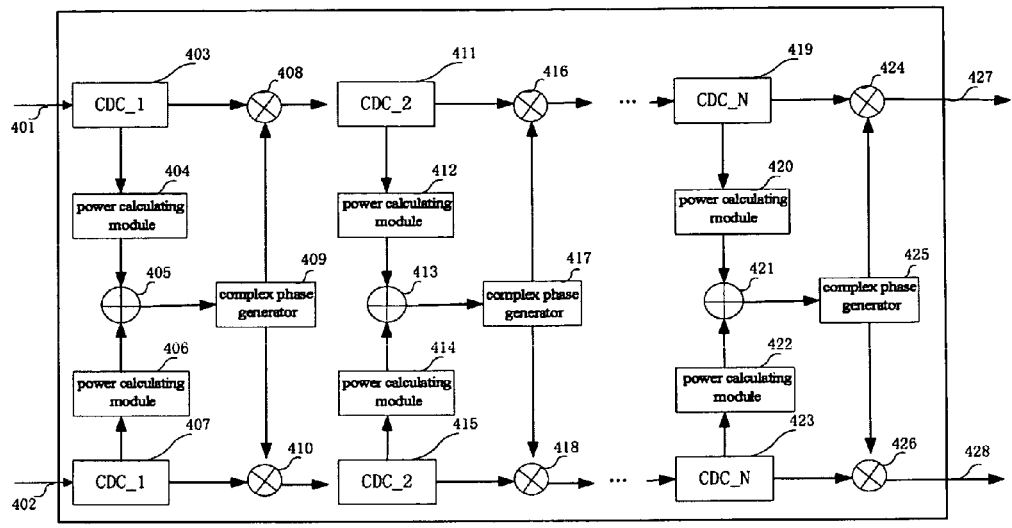
FIG. 4 is a schematic diagram of an apparatus for self-phase modulation noise elimination in a dual-polarization optical coherent receiver in the prior art.

FIG. 3 is a schematic diagram of apparatus for self-phase modulation noise elimination in a single-polarization optical coherent receiver in prior art, and FIG. 4 is a schematic diagram of apparatus for self-phase modulation noise elimination in a dual-polarization optical coherent receiver in prior art. The so-called self-phase modulation noise elimination is realized by using the digital signal processing technology to analogously perform reverse transmission so as to obtain the fluctuations of the signal power during transmission, then calculating the numerical value of the self-phase modulation noise based on the fluctuations, and finally multiplying inversely the self-phase modulation noise by the signal. Wherein, the compensation performance of the apparatus is directly dependent on the calculation precision of the self-phase modulation.

As shown in FIG. 3, the received baseband electrical signal 301 passes through N cascades of electrical dispersion compensation modules CDC_1-CDC_N; wherein after the first cascade of the electrical dispersion is compensated, the signal power at current instant is calculated by a power calculating module 304 (the waveform signal s(t) output by CDC_1 at current instant is performed a modulo operation and squared); the signal power at current instant is input into a complex phase generator 305, which reverses the signal power after it is multiplied by a nonlinear coefficient $\gamma_{NL}^{i}$ of the fiber, so as to obtain the reverse value of the self-phase modulation noise at current instant, and converts the reverse value of the self-phase modulation noise into a complex form (expressed by a formula $\exp[-j\gamma_{NL}^{i}(|s(t)|^2)]$); and wherein the self-phase modulation noise elimination is realized by multiplying the output of the complex phase generator 305 by the output signal waveform of the electrical dispersion compensation module CDC_1 via a multiplier 303.

As shown in FIG. 4, the calculation and elimination modules of the self-phase modulation noise of the dual-polarization optical coherent receiver is similar to that of the single-polarization optical coherent receiver, with the exception that in the dual-polarization optical coherent receiver, since the signal is modulated at the two polarization states at the same time, and when the self-phase modulation is calculated, the signal powers at the two polarization states should be calculated at the same time, and then added up and multiplied by $\gamma_{NL}^{i}$. In addition, in some known arts, the signal powers at two polarization states are multiplied by different $\gamma_{NL}^{i}$ and then added up.

However, it is found by the applicant in carrying out the present invention that the defect of the prior art exists in: at present, when performing the self-phase modulation, the self-phase modulation at a certain instant is only related to the signal waveform at this instant; while since the signal waveform at each instant changes along with the dispersion accumulation, when the values of the dispersion accumulation in each sub-span change greatly, the precision of such self-phase modulation calculation technology will be poor; and in order to ensure the precision of the calculation, the changes of the values of the dispersion accumulation in each sub-span must be less to an extent that the effect of such changes on the self-phase modulation may be ignored, and in such a case, it needs to divide logically the whole transmission link into a plurality of spans for calculation, and the more the spans, the higher the complexity of the calculation.

As to apparatus for self-phase modulation noise elimination, its performances are directly dependent on the calculation precision of the self-phase modulation; in the prior art, the number M of the simulated transmission spans should be equal to N times of the number S of spans of the fiber cascades in an actual channel (i.e. M=N×S), and in general, N should be at least greater than or equal to 1, namely, the number of transmission spans which are simulated using digital signal processing should be at least greater than or equal to the number of spans of the fiber cascades in a transmission channel so as to obtain the acceptable compensation performance. In an ordinary case, the number of spans of the fiber cascades in an actual transmission channel is ten plus to several tens of decades, and such a high complexity of calculation lays extremely high requirement on the hardware implementation of the digital signal processing.

Various embodiments of the present invention will be described in the following with reference to the drawings. These embodiments are exemplary only and not limitative to the present invention. For the easy understanding of the principle and embodiments of the present invention by those skilled in the art, the embodiments of the present invention will be described taking the calculation of the self-phase modulation noise of a fibre channel of an optical communication system as an example. However, it should be noted that the embodiments of the present invention are applicable to all the communication systems in which a self-phase modulation noise exists, and are not limited to optical communication systems only.

Figure 5:
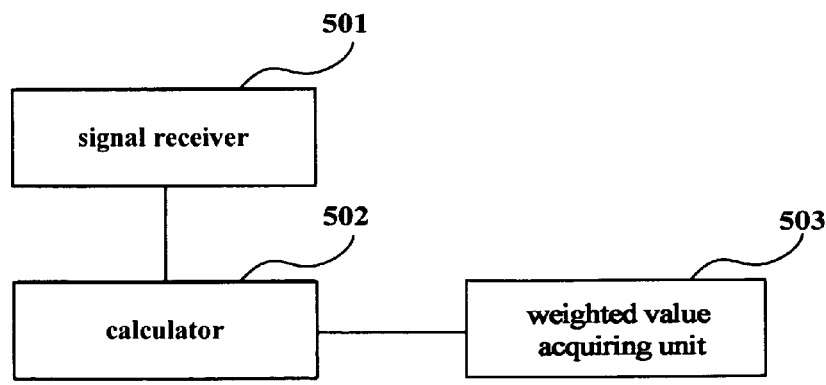
FIG. 5 is a schematic diagram of the structure of the apparatus for self-phase modulation noise calculation in accordance with the first embodiment of the present invention.

FIG. 5 is a schematic diagram of the structure of the apparatus for self-phase modulation noise calculation of an embodiment of the present invention. As shown in FIG. 5, the apparatus comprises a signal receiver 501 and calculator 502, wherein the a signal receiver 501 is used to receive an input signal, and the calculator 502 is connected to the signal receiver 501 and used to calculate a self-phase modulation noise at the current instant by using the signal powers of an input signal waveform at the current instant and at several sampling instants adjacent to the current instant.

Furthermore, in this embodiment, the apparatus comprises a transmitter (not shown) to transmit the self-phase modulation noise calculated by the calculator 502.

It can be seen from the above embodiment that not only the signal power at this instant but the signal powers at a plurality of digital sampling periods before and after this instant are also considered, and in this way, when the apparatus is applied to the system shown in FIG. 1, in case that a certain precise is ensured, the granularity of the sub-spans is made to be relatively large, thereby lowering the complexity of the calculation of the self-phase modulation. In addition, when the apparatus is applied to the apparatus for self-phase modulation noise elimination, the cascade number of the electric dispersion compensation modules in the apparatus for self-phase modulation noise elimination is reduced and the complexity of the hardware implementation of the apparatus for self-phase modulation noise elimination is also reduced.

In this embodiment, the calculator 502 is in particular used to calculate the self-phase modulation noise at current instant by using the averaged weight of the signal powers of the input signal waveforms at the current instant and at several sampling instants adjacent to the current instant.

Figure 6:
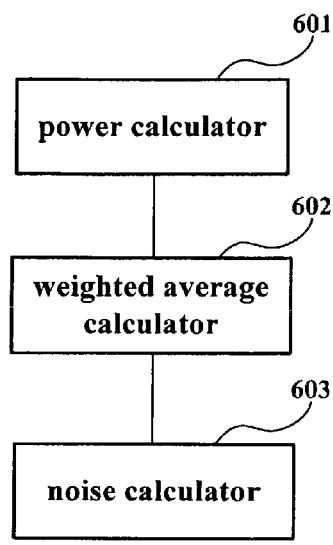
FIG. 6 is a schematic diagram of the structure of the calculator 502 in accordance with the first embodiment of the present invention.

FIG. 6 is a schematic diagram of the structure of the calculator 502 in accordance with the first embodiment of the present invention. As shown in FIG. 6, the calculator 502 comprises a power calculator 601, a weighted average calculator 602, and a noise calculator 603, wherein the power calculator 601 is used to calculate the signal powers of the input signal waveforms at the current instant and at several sampling instants adjacent to the current instant;

the weighted average calculator 602 is used to weighted average the signal powers of the input signal waveforms at the current instant and at several sampling instants adjacent to the current instant calculated by the power calculator 601; and the noise calculator 603 is used to multiply the weighted averaged signal powers calculated by the weighted average calculator 602 by a predetermined coefficient and convert them into a complex form, so as to obtain the self-phase modulation noise at current instant in a complex form.

In this embodiment, the weighted average calculator 602 employs the following formula in calculation:

$$p_t = \sum_{i=-k}^{i=+k} w_i p(t - i \times T) \quad (1)$$

and the noise calculator 603 employs the following formula to obtain the complex form of the self-phase modulation noise at current instant:

$$spm_t = e^{j\gamma_{NL} \times p_t} \quad (2)$$

where, $w_i$ represents the weighted values after being weighted averaged, which are a set of real numbers representative of the correlation degree of the signal powers at adjacent instants with the self-phase modulation noise at current instant; t represents the current instant; i represents the ith adjacent instant, with $-k \leq i \leq k$, and k being a positive integer; T represents the digital sampling period of the signal; $p(t-i \times T)$ represents the signal power at $(t-i \times T)$ sampling instant; and $\gamma_{NL}$ represents the nonlinear coefficient of the optical fiber.

In this embodiment, the above apparatus may be applied to the optical fiber transmission system shown in FIG. 1 to calculate the self-phase modulation noise in a transmitting signal fiber 102 and a dispersion compensation fiber DCF 104 generated during transmission. The method for calculating the self-phase modulation noise in the optical fiber transmission system of an embodiment of the present invention shown in FIG. 1 will be described in the following with reference to FIG. 7.

Figure 7:
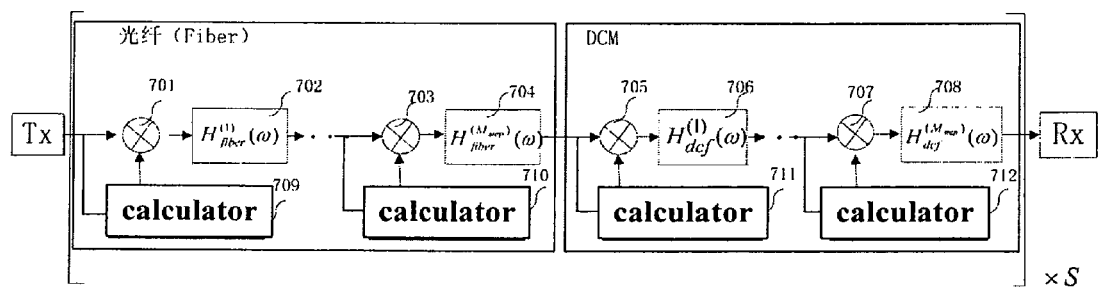
FIG. 7 is a diagram of the application example of the apparatus for self-phase modulation noise calculation in accordance with the first embodiment of the present invention.

Due to the optical fiber dispersion in the transmission link, the signal power in transmission changes along with the transmission distance, so the whole link should be divided into a plurality of sub-spans and the calculation should be performed sub-span by sub-span. As shown in FIG. 7, a span of fiber 102 and a dispersion compensation fiber 104 are divided into a plurality of sub-spans along the direction of transmission, such as M sub-spans, and in each of the sub-spans, multipliers 701, 703, 705 and 707, dispersion calculation modules 702, 704, 706 and 708, and calculators 709, 710, 711 and 712 for calculating the self-phase modulation noise, are included.

Wherein, the above-mentioned apparatus for self-phase modulation noise calculation may be used as the calculating means 709, 710, 711 and 712 for calculating the self-phase modulation noise. For example, when the self-phase modulation noise of a first span is calculated, the calculator 709 first receives the signal transmitted by a transmitting end Tx and calculates the signal powers of the waveform of the received input signal at current instant and at several sampling instants adjacent to the current instant; weighted averages the calculated signal powers at current instant and at several sampling instants adjacent to the current instant; performs multiplication of the weighted averaged signal powers by a predetermined coefficient and convert them into a complex form, so as to obtain the self-phase modulation noise of the first span at current instant in a complex form; then the calculator 709 transmits the self-phase modulation noise in a complex form to the multiplier 701, and the multiplier 701 performs multiplication of the self-phase modulation noise by an input signal waveform and then transmits to the dispersion calculation module 702, which is transmitted to the next span after dispersion calculation; when the self-phase modulation noise of a next span is calculated, the input signal is the signal output from the preceding dispersion calculation module 702, and other procedures of calculation are similar to those mentioned above and shall not be described further, until the self-phase modulation noise of the last span is calculated by the calculator 712 and multiplied via the multiplier 707 by the signal output by the calculation module 706, and the multiplied signal is input into the dispersion calculation module 708 for dispersion calculation and then output to a receiving end Rx.

It can be seen from above that when the apparatus is applied to optical fiber link transmission, the signal powers at adjacent instants of each of the sub-spans are combined and the effect of changes of the accumulated dispersion in each sub-span on the self-phase modulation is absorbed into the weighted coefficient $w_i$, and in this way, the requirement in the prior art is loosened that the change of the accumulated dispersion in each sub-span must be small to an extent that the effect of such a change on the self-phase modulation may be ignored. Thus, a relatively large granularity of the sub-span may be used while ensuring the precision of the calculation, namely, the number of the sub-spans is relatively less. For example, in the prior art as shown in FIG. 2, the number of the sub-spans is N, and when the apparatus of the embodiment of the present invention is used, as shown in FIG. 7, the number of the sub-spans M is less than N while the same precision is realized, thereby lowering the complexity of the calculation.

In this embodiment, as shown in FIG. 5, the apparatus further comprises a weighted value acquiring unit 503 to acquire a weighted value sequence; furthermore, the apparatus comprises a storing unit (not shown) to store the acquired weighted value sequence.

Wherein the weighted value acquiring unit 503 acquires the weighted values in multiple ways, such as acquiring the weighted values in a manner based on monitoring, or acquiring the weighted values in a manner based on try and calculation, or acquiring the weighted values in a manner based on assumption, which will be described in the following in way of example, but the manners are not limited to the embodiment as described below.

Figure 8:
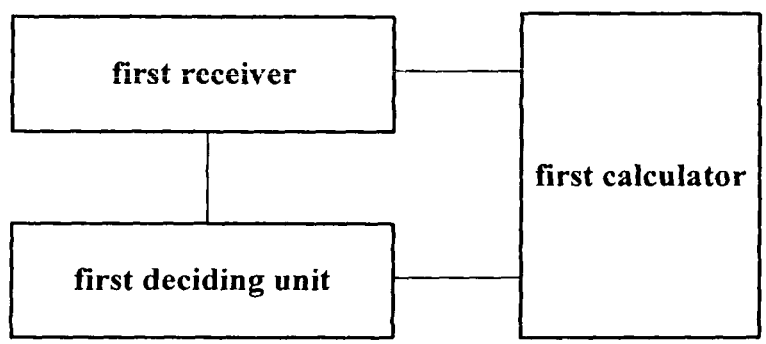
FIG. 8 is a schematic diagram of the structure of the weighted value acquiring unit in accordance with the first embodiment of the present invention.

Example 1 the weighted value acquiring unit 503 acquires the weighted value sequence $w_i$ by monitoring the correlation degree in time domains between the self-phase modulation noise and the signals at adjacent instants;

in the case as above, as shown in FIG. 8, the weighted value acquiring unit 503 may comprise:

a first receiver 801 to receive a signal containing a self-phase modulation noise which is a single-polarization or dual-polarization signal;

a first deciding unit 802 to decide the signal received by the first receiver 801 with respect to data, so as to acquire a signal containing no self-phase modulation noise;

a first calculator 803 to calculate the weighted value sequence by using the signal received by the first receiver 801, the signal obtained by the first deciding unit 802 after data decision, and the signals at the ith and the (i+N)th instants prior to the current instant; where, N is a predetermined integer greater than or equal to 0 (dual-polarization) or 1 (single-polarization).

Figure 9:
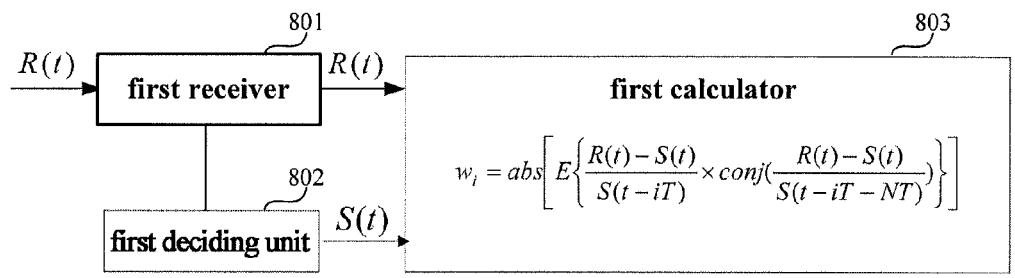
FIG. 9 is a schematic diagram of the calculation of the weighted value when a single-polarization signal is received in accordance with the first embodiment of the present invention.

In this embodiment, as shown in FIG. 9, when the signal received by the first receiver 801 is a single-polarization signal R(t), the first deciding unit 802 performs the data decision with respect to the received signal and obtains S(t), wherein data decision may be carried out in any manner in the prior art; then the first calculator 803 calculates the weighted value sequence $w_i$ by using the following formula:

$$w_i = \text{abs}\left[ E\left\{ \frac{R(t) - S(t)}{S(t-iT)} \times \text{conj}\left( \frac{R(t) - S(t)}{S(t-iT-NT)} \right) \right\} \right] \quad (3)$$

where, R(t) represents a signal containing a self-phase modulation noise (corresponding to the signal at the receiving end); S(t) represents the signal obtained by performing data decision to R(t) (corresponding to the signal at the receiving end containing no self-phase modulation noise); S(t−iT) represents the signal at ith instant prior to the current instant, and S(t−iT−NT) represents the signal at (i+N)th instant prior to the current instant, wherein N≥1; wherein the two signals $S_h$(t−iT) and $S_v$(t−iT−NT) are obtained by delaying the received signals as in the prior art, and shall not described any further.

Figure 10:
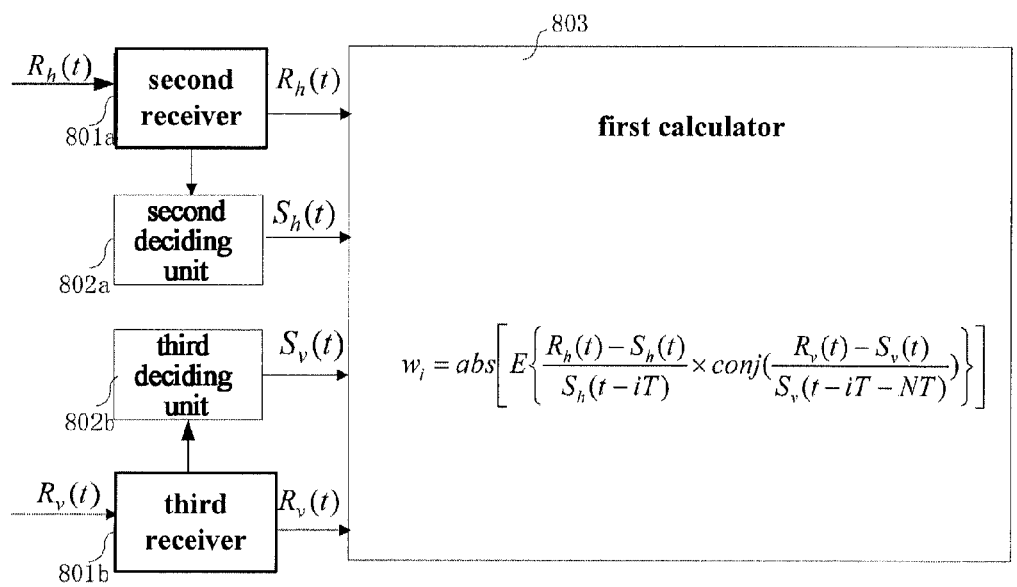
FIG. 10 is a schematic diagram of the calculation of the weighted value when a dual-polarization signal is received in accordance with the first embodiment of the present invention.

In this embodiment, as shown in FIG. 10, when the signal received by the first receiver 801 is a dual-polarization signal, the first receiver 801 may comprise a second receiver 801a and a third receiver 801b to respectively receive signals $R_h$(t) and $R_v$(t) at the two polarization states, and the first deciding unit 802 may comprise second deciding unit 802a and third deciding unit 802b to respectively perform data decision to the signals $R_h$(t) received by the second receiver 801a and $R_v$(t) received by the third receiver 801b to obtain $S_h$(t) and $S_v$(t), wherein the first calculator 803 calculates the weighted value sequence $w_i$ by using the following formula:

$$w_i = \text{abs}\left[ E\left\{ \frac{R_h(t) - S_h(t)}{S_h(t-iT)} \times \text{conj}\left( \frac{R_v(t) - S_v(t)}{S_v(t-iT-NT)} \right) \right\} \right] \quad (4)$$

where, $R_h$(t) and $R_v$(t) respectively represent the signals at the two polarization states containing a self-phase modulation noise; $S_h$(t) and $S_v$(t) respectively represent the signals obtained by performing data decision to $R_h$(t) and $R_v$(t); $S_h$(t−iT) represents the signal at ith instant prior to the current instant, and $S_v$(t−iT−NT) represents the signal at (i+N)th instant prior to the current instant, wherein N≥0.

In the above formulae (3) and (4), E represents averaging, and abs represents performing a modulo operation.

In above example 1, if the apparatus is applied to the apparatus for self-phase modulation noise elimination in an optical coherent receiver, R(t), $R_h$(t) and $R_v$(t) may be signals output by a digital phase retrieving unit in the receiver.

Example 2 the weighted value acquiring unit 503 acquires the weighted value $w_i$ sequence in a process in which it seriatim assumes one or more of the weighted value $w_i$ sequence and seriatim determines the corresponding values at the optimal performance of the equipment used in the apparatus after several times determination.

Figure 11:
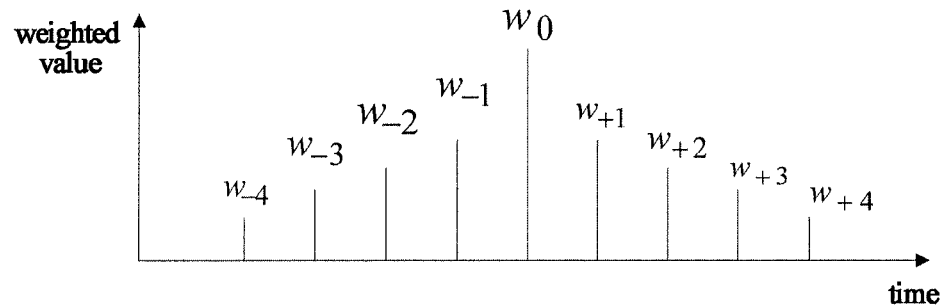
FIGS. 11-14 are schematic diagrams of the calculation of weighted value sequences.

For example, when the apparatus is applied to the apparatus for self-phase modulation noise elimination in an optical coherent receiver, for k instants before and after the current instant t, for instance, k=4, the weighted values respectively correspond to $w_{-4}, w_{-3}, w_{-2}, w_{-1}, w_0, w_1, w_2, w_3$ and $w_4$; first, assume one of the values, such as $w_0$, and other values are 0, and then adjust $w_0$, the assumed $w_0$ at the optimal performance of the receiver is the acquired weighted value $w_0$; then assume other weighted values in turn while keeping the determined acquired weighted value $w_0$ constant, and acquire other weighted values $w_{-4}, w_{-3}, w_{-2}, w_{-1}, w_1, w_2, w_3$ and $w_4$ in the same manner; as shown in FIG. 11, after all the weighted values are acquired, the process may be repeated on the basis of the determined weighted values, and the process is similar to the above and shall not be described further. The above process for determining the weighted values may be repeated several times.

Example 3 the weighted value acquiring unit 503 can assume the function satisfied by the weighted value $w_i$ sequence, and determines the corresponding coefficient at the optimal performance of the equipment used in the apparatus by alternating the coefficient of the function to acquire the weighted value $w_i$ sequence.

For example, when the function satisfied by the form of the weighted value $w_i$ sequence is an exponential function, i.e. $w_i = \exp(\alpha iT)$, where, α is the coefficient of the exponential function, i represents the ith instant, and T represents the sampling period, change the numerical value of α while monitoring the optimal performance of the equipment used in the apparatus; and when the modulator is applied to the apparatus for self-phase modulation noise elimination in an optical coherent receiver, the corresponding value of α is optimal when the performance of the receiver is optimal, thereby acquiring the weighted value sequence according to the exponential function corresponding to the optimal value of α.

Figure 12:
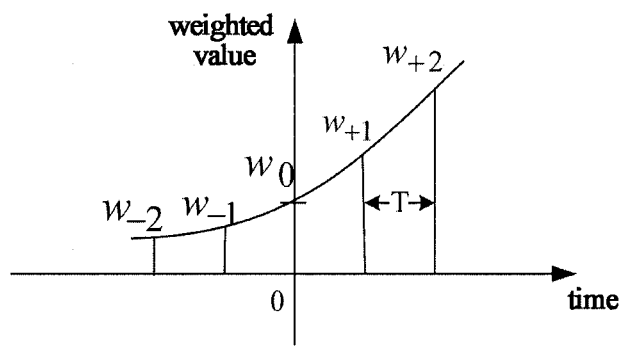

For example, when the optimal value of α is 1, the weighted value sequence satisfies function $w_i = \exp(\alpha iT)$ and the acquired sequence of the weighted value is shown in FIG. 12.

The above description is provided taking an exponential function as an example; however, it is just an embodiment of the present invention and is not limited the above function only, and other functions may also be used in the determination.

Figure 13:
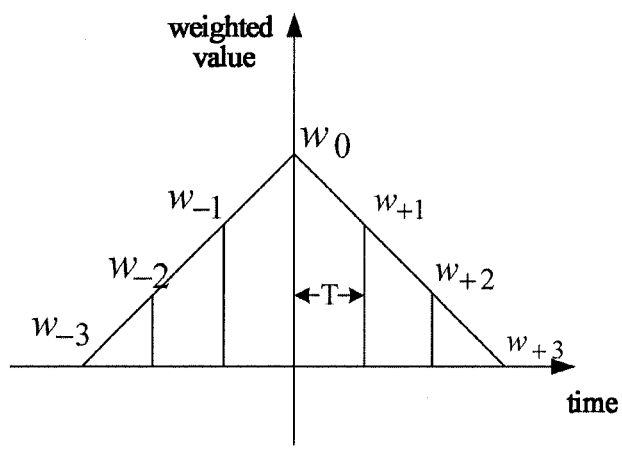

Example 4 the weighted value acquiring unit 503 can assume the form of the weighted value $w_i$ sequence, and acquires sequence of the weighted value $w_i$ according to the assumed form; for example, assuming the form of the weighted value sequence is an isoceles triangle, the weighted value is obtained by adjusting the included angle of the two equal sides or the height of the isoceles triangle, as shown in FIG. 13.

Figure 14:
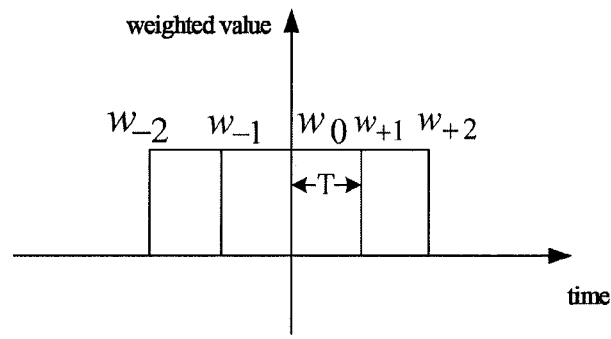

For example, assuming the form of the weighted value sequence is rectangle, the length of the sides are adjusted; and at this time, all the weighted values are equal, belonging to a particular case of a triangle, as shown in FIG. 14.

Figure 15:
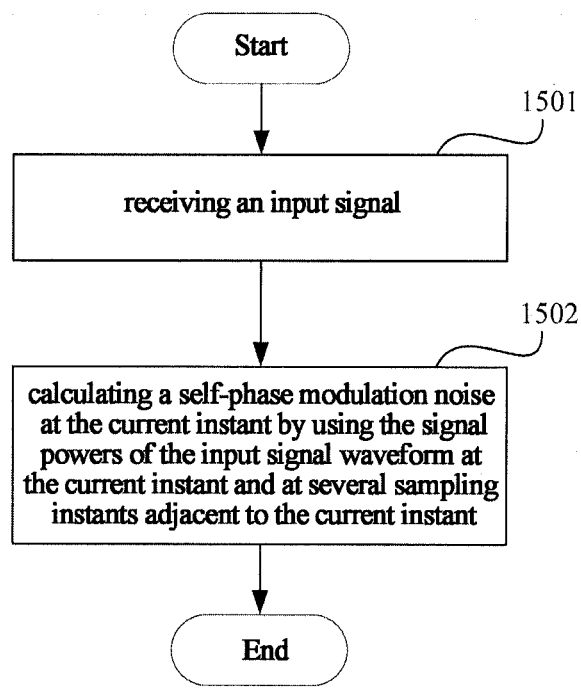
FIG. 15 is a flow chart of the modulation method in accordance with the embodiments of the present invention.
Figure 16:
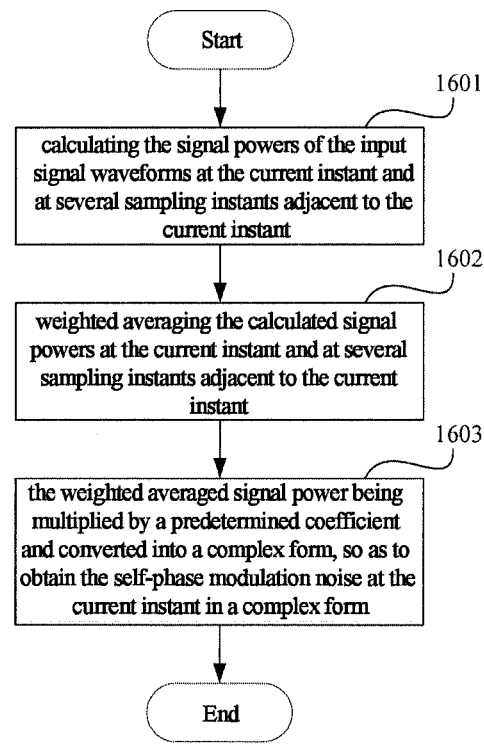
FIG. 16 is a flow chart of the implementing method of step 1502 in FIG. 15.

The flowchart of the method of modulation of the apparatus is described in the following with reference to FIG. 15. When the apparatus is used to calculate the self-phase modulation noise in a span of fiber, the following steps are employed:

step 1501: receiving an input signal;

step 1502: calculating a self-phase modulation noise at the current instant by using the signal powers of the input signal waveform at the current instant and at several sampling instants adjacent to the current instant;

wherein in the step 1502, the self-phase modulation noise at the current instant is calculated by using the average weight of the signal powers of the input signal waveform at the current instant and at several sampling instants adjacent to the current instant, as shown in FIG. 16, the step comprising:

step 1601: calculating the signal powers of the input signal waveforms at the current instant and at several sampling instants adjacent to the current instant;

wherein the method of calculating the signal powers is to perform a modulo operation to the input signal waveforms and then squared;

step 1602: weighted averaging the calculated signal powers at the current instant and at several sampling instants adjacent to the current instant;

wherein formula (1) may be used in the weighted averaging, which shall not be describe further;

step 1603: multiplying the weighted averaged signal power by a predetermined coefficient and converting it into a complex form, so as to obtain the self-phase modulation noise at the current instant in a complex form;

wherein formula (2) may be used in calculating the self-phase modulation noise, which shall not be describe further.

Furthermore, a step of acquiring a sequence of a weighted value may be further included, in which the calculation may be performed by using the weighted value sequence in weighted averaging the powers. The detailed manner of acquiring the weighted value sequence is as state above and shall not be described further.

When the above apparatus is applied to the optical fiber transmission link as shown in FIG. 7, the optical fiber is divided into M spans and the calculation of the self-phase modulation noise is performed on the basis of the spans. The method for calculating the self-phase modulation noise when an input signal is transmitted in the optical fiber will be described in the following with reference to FIGS. 7 and 17.

Figure 17:
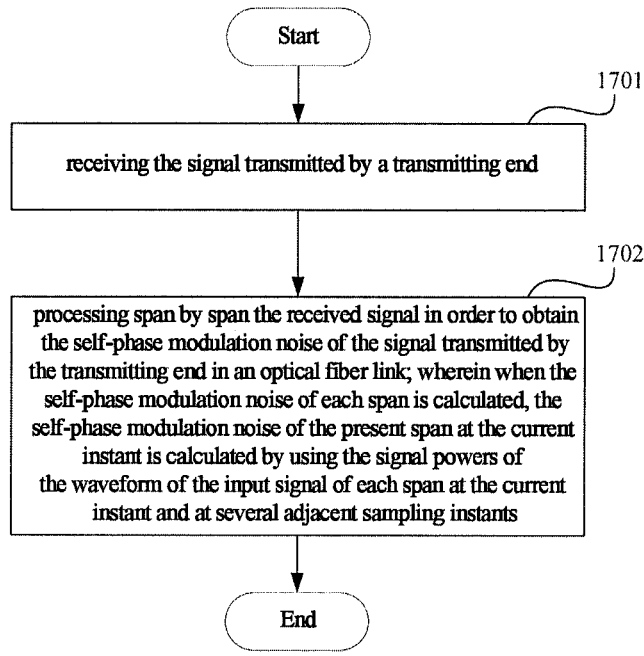
FIG. 17 is a flow chart of the method of calculating the self-phase modulation noise in the optical fiber transmission link in accordance with the embodiments of the present invention.

As shown in FIG. 17, the method for calculating the self-phase modulation noise comprises:

step 1701: receiving the signal transmitted by a transmitting end Tx;

step 1702: processing span by span the received signal in order to obtain the self-phase modulation noise of the signal transmitted by the transmitting end Tx in an optical fiber link; wherein when the self-phase modulation noise of each span is calculated, the self-phase modulation noise of the present span at the current instant is calculated by using the signal powers of the waveform of the input signal of each span at the current instant and at several adjacent sampling instants, then the self-phase modulation noise is multiplied via a multiplier by the waveform of the input signal of the present span and transmitted to the next span via a dispersion calculating unit;

where in step 1702, the method for calculating the self-phase modulation noise of each span is similar to that shown in FIG. 16 and shall not be described further. Wherein when the self-phase modulation noise of the first span is calculated, the received signal is the signal transmitted by the transmitting end Tx, and when the self-phase modulation noise of the ith span is calculated, the received signal is the signal output from the preceding span after dispersion calculation;

in addition, in each of the spans, after the self-phase modulation noise in a complex form of the present span is obtained by using the method shown in FIG. 16, the self-phase modulation noise in a complex form may be multiplied by the waveform of the input signal and then transmitted to the next span after dispersion calculation; when the self-phase modulation noise of the next span is calculated, and input signal is that output from the preceding span after dispersion calculation, and other procedures for calculation are similar to those mentioned above and shall not be described further, until the self-phase modulation noise of the last span is calculated and multiplied by the signal output from the preceding span after dispersion calculation, and the multiplied signal is input and subjected to dispersion calculation and then output to a receiving end Rx.

It can be seen from the above embodiments that when the self-phase modulation noise at a certain instant is calculated, the signal power at this instant is also considered while the powers of a signal of a plurality of digital sampling periods before and after this instant are considered and in this way, when the apparatus is applied to the system shown in FIG. 1, in case that a certain precise is ensured, the granularity of the sub-spans may be relatively large, thereby lowering the complexity of the calculation of the self-phase modulation. Furthermore, there are many manners for acquiring the weighted values.

In the embodiments of the present invention, the above apparatus may be applied to the apparatus for self-phase modulation elimination in an optical coherent receiver. Since the effect of the accumulated changes in dispersion on the self-phase modulation are absorbed into the weighted values, the calculation of the self-phase modulation may be performed at a relatively large granularity, and the cascade number of the electric dispersion compensation modules in the apparatus for self-phase modulation elimination may be much less than that in the prior art.

The apparatus for self-phase modulation elimination of the second embodiment of the present invention will be described in the following with reference to the drawings.

Figure 18:
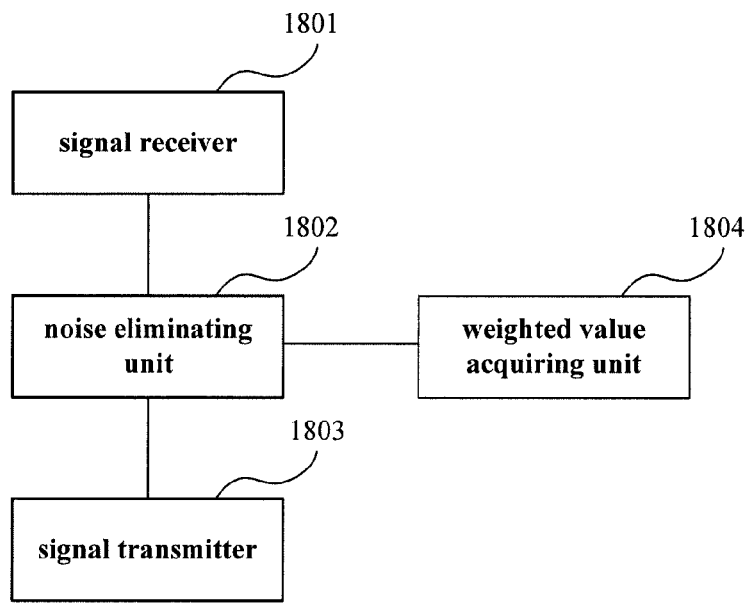
FIG. 18 is a schematic diagram of the structure of the apparatus for self-phase modulation noise elimination in accordance with the second embodiment of the present invention.

FIG. 18 is a schematic diagram of the structure of the apparatus for self-phase modulation noise elimination in accordance with the second embodiment of the present invention. As shown in FIG. 18, the apparatus comprises a signal receiver 1801, a noise eliminating unit 1802 and a signal transmitter 1803, wherein:

the signal receiver 1801 is used to receive a baseband electric signal;

the noise eliminating unit 1802 is used to process the received baseband electric signal step by step to eliminate an adaptive modulation noise; wherein in each step of the processing, the signal powers, at the current instant and at several sampling instants adjacent to the current instant, of the electrically dispersion compensated signal waveform in current step, are used to calculate the self-phase modulation noise at the current instant and obtain the inverse number of the self-phase modulation noise, and the inverse number of the self-phase modulation noise is converted into a complex form, which is multiplied by the electrically dispersion compensated signal waveform in the current step to eliminate the self-phase modulation noise in the current step;

the signal transmitter 1803 is used to transmit the signal processed by the noise eliminating unit.

In this embodiment, the noise eliminating unit 1802 comprises a multi-cascade signal processor, wherein each cascade of the signal processor comprises:

an electric dispersion compensator to electrically compensate the dispersion of the received signal;

a power calculator to calculate the signal powers at the current instant and at several sampling instants adjacent to the current instant according to the waveform of the signal after being electrically dispersion compensated by the electric dispersion compensator;

a weighted average calculator to weighted average the signal powers at the current instant and at several sampling instants adjacent to the current instant calculated by the power calculator;

a complex phase generator to multiply the signal powers after weighted averaging obtained by the weighted average calculator by a predetermined coefficient, then inverse it to obtain an inverse number of the self-phase modulation noise, and perform complex conversion processing to the inverse number of the self-phase modulation noise to obtain a complex form of the inverse number of the self-phase modulation noise at the current instant; and a multiplier to multiply the inverse number of the self-phase modulation noise in complex form generated by the complex phase generator by the signal waveform after being compensated by the electric dispersion compensator to eliminate the self-phase modulation noise of the current cascade.

Figure 19:
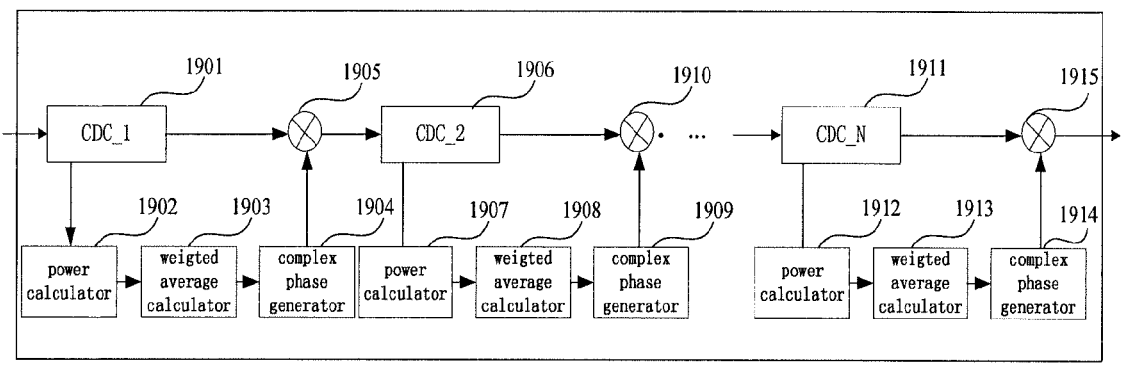
FIG. 19 is a schematic diagram of the structure of the self-phase modulation noise elimination unit in accordance with the second embodiment of the present invention when the signal is a single-polarization signal.

FIG. 19 is a schematic diagram of the structure of the noise eliminating unit 1802 of the second embodiment of the present invention when the signal is a single-polarization signal. As shown in FIG. 19, the noise eliminating unit 1802 comprises a multi-cascade signal processor, wherein each cascade of the signal processor comprises:

electric dispersion compensator 1901, 1906 and 1911 to electrically compensate the dispersion of the received signal;

power calculators 1902, 1907 and 1912 to calculate the signal powers at the current instant and at several sampling instants adjacent to the current instant according to the waveform of the signal with its dispersion being electrically compensated by the electric dispersion compensating units 1901, 1906 and 1911;

weighted average calculators 1903, 1908 and 1913 to weighted average the signal powers at the current instant and at several sampling instants adjacent to the current instant calculated by the power calculators 1902, 1907 and 1912 to calculate the self-phase modulation noise at the current instant;

complex phase generators 1904, 1909 and 1914 to multiply the signal powers after weighted averaging obtained by the weighted average calculators 1903, 1908 and 1913 by a predetermined coefficient, then inverse it to obtain an inverse number of the self-phase modulation noise, and perform complex conversion processing to the inverse number of the self-phase modulation noise to obtain a complex form of the inverse number of the self-phase modulation noise at the current instant; wherein the predetermined coefficient is a nonlinear coefficient of the optical fiber; and multiplier 1905, 1910 and 1915 to multiply the complex form of the inverse number of the self-phase modulation noise generated by the complex phase generators 1904, 1909 and 1914 by the waveform of the signal after being compensated by the electric dispersion compensating units 1901, 1906 and 1911 to eliminate the self-phase modulation noise of the current cascade.

Figure 20:
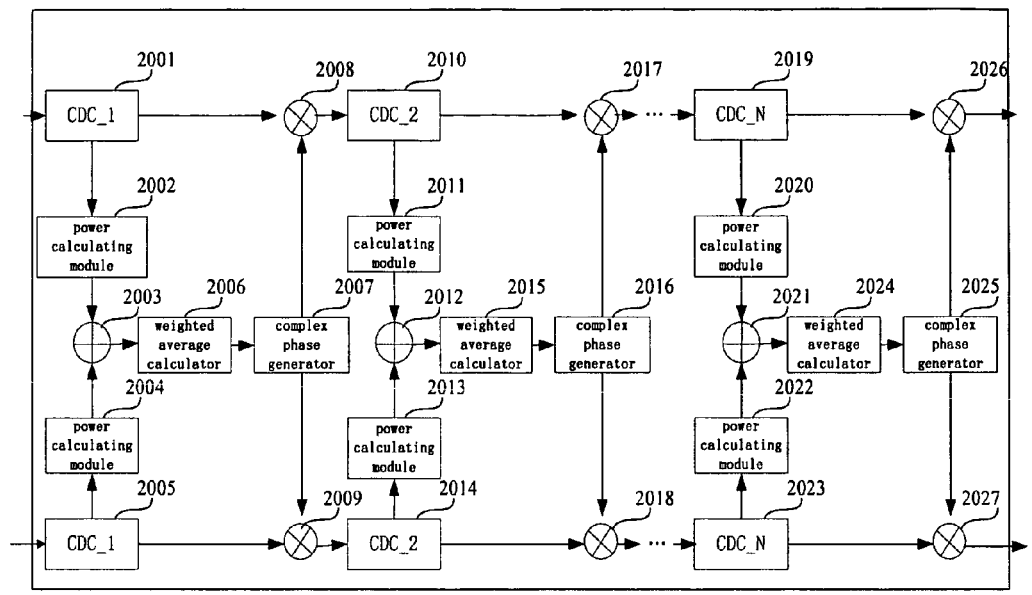
FIG. 20 is a schematic diagram of the structure of the noise elimination unit 1502 in accordance with the second embodiment of the present invention when the signal is a single-polarization signal.

FIG. 20 is a schematic diagram of the structure of the noise eliminating unit 1802 of the second embodiment of the present invention when the signal is a dual-polarization signal. It is similar to that when the signal is a single-polarization signal, with the exception that weighted average calculators 2006, 2015 and 2024 weighted average the sum of the powers of the dual-polarization signals, and then complex phase generators 2007, 2016 and 2025 process the weighted averaged signals, and transmit respectively the processing result to the multiplier 2008, 2009, 2017, 2018, 2026 and 2027 corresponding to each of the signals in the dual-polarization signals.

In the above embodiment, the power acquiring units in FIGS. 19 and 20 acquire the signal powers at the current instant and at several sampling instants according to the waveform of the signal of the current cascade with its dispersion being compensated by the electric compensating units and in particular, perform a modulo operation to the signal and then square, i.e. $|s(t-iT)|^2$.

The weighted average calculators in FIGS. 19 and 20 may use formula (1) to calculate, which shall not be described further.

The complex phase generators in FIGS. 19 and 20 perform multiplier of the signal powers after weighted averaging obtained by the weighted average calculators by a predetermined coefficient, then inverse to obtain an inverse number of the self-phase modulation noise, and perform complex conversion processing to the inverse number of the self-phase modulation noise to obtain a complex form of the inverse number of the self-phase modulation noise at the current instant, and the following formula may be used in calculation: $e^{-j\gamma_{NL} \times P_t}$, which shall not be described further.

It is proved by experiments that, after the apparatus for self-phase modulation noise elimination of the embodiments of the present invention is adopted, the cascade number of the dispersion compensation modules may be reduced by about 70%, greatly lowering the complexity of the hardware implementation of the apparatus for self-phase modulation noise elimination. For example, in an optical fiber transmission link of 1200 kilometers, 20 cascades are needed if the prior art shown in FIG. 3 or 4 is used, while only 6 cascades are needed when the technology of the embodiments of the present invention is adopted.

As shown in FIG. 18, the apparatus may further comprise a weighted value acquiring unit 1804, which uses the manner of acquiring weighted values as stated in the above embodiments and shall not be described further.

Figure 21:
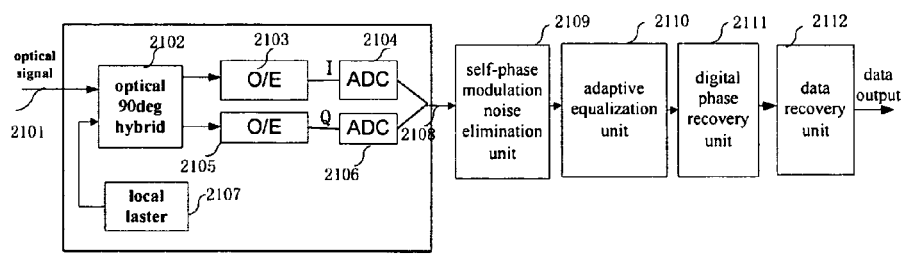
FIG. 21 is a schematic diagram of the structure of the single-polarization optical coherent receiver in accordance with the third embodiment of the present invention.

FIG. 21 is a schematic diagram of the structure of the single-polarization optical coherent receiver in accordance with the third embodiment of the present invention. The corresponding unit in the second embodiment may be used as the self-phase modulation noise elimination unit 2109 in FIG. 21. Other parts of the receiver in FIG. 21 are known art which will be described in the following in brief.

As shown in FIG. 21, the receiver comprises:

a front end, with the function to convert an input optical signal 2101 into a baseband signal 2108 which may be expressed as I+jQ, and in normal cases, the argument of the baseband signal 2108 contains not only data information $\phi_d$, but also a phase shift $\phi_0$ between the carrier and the local oscillator, and the effect $\phi_n$ of the noise on the phase; any of the existing manners may be used to convert; in this embodiment, the front end comprises an optical 90 deg hybrid 2102, a local laser 2107, optoelectronic detectors 2103, 2105, and analog-to-digital converters 2104, 2106;

as shown in FIG. 21, the local laser 2107 provides a local light source, and the optical signal is converted into a baseband signal after passing through the optical 90 deg hybrid 2102, the optoelectronic detectors 2103, 2105, and the analog-to-digital converters 2104, 2106, in a procedure similar to that in the prior art which shall not be described further.

In addition, as shown in FIG. 21, the receiver further comprises:

a self-phase modulation noise elimination unit 2109 to receive the baseband signal output from the front end, which uses the apparatus of the second embodiment to eliminate the self-phase modulation noise, which shall not be described further;

an adaptive equalization unit 2110 connected to the self-phase modulation noise elimination unit 2109 to perform adaptive compensation to the linear damages in the link;

a digital phase recovery unit 2111 connected to the adaptive equalization unit 2110 to receive the signals output from the adaptive equalization unit 2110 and eliminate the phase shift $\phi_0$ in the signals;

a data recovery unit 2112 connected to the digital phase recovery unit 2111 to decide data information $\phi_d$ according to the output of the digital phase recovery unit 2111, and then outputs the decided data information.

When the self-phase modulation noise elimination unit is used, in calculating the weighted values in a manner of monitoring, the input signal $R_t$ is the signal output from the adaptive equalization unit 2110.

Figure 22:
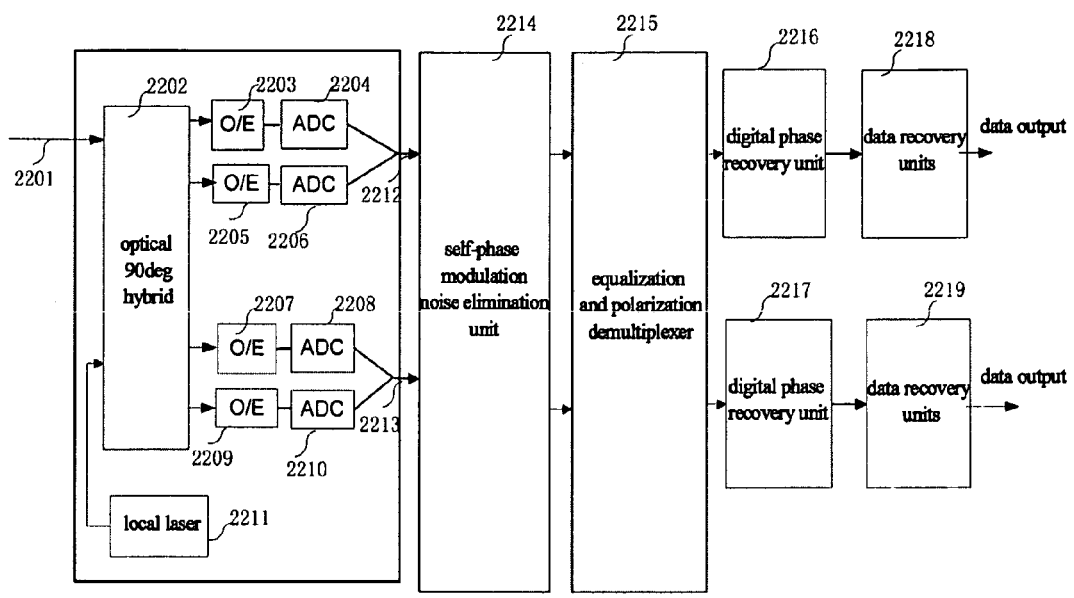
FIG. 22 is a schematic diagram of the structure of the dual-polarization optical coherent receiver in accordance with the fourth embodiment of the present invention.

FIG. 22 is a schematic diagram of the structure of the dual-polarization optical coherent receiver in accordance with the fourth embodiment of the present invention. The apparatus of the second embodiment may be used as the self-phase modulation noise elimination unit 2214 shown in FIG. 22. Other parts of the receiver in FIG. 22 are known art, which may be found in "Transmission of 42.8 Gbit/s Polarization Multiplexed NRZ-QPSK over 6400 km of Standard Fiber with no Optical Dispersion Compensation", S. J. Savory et. al., OFC2007, paper OTuA1, which is incorporated herein by reference.

As shown in FIG. 22, the structure of the receiver is similar to that in shown in FIG. 21, with the exception that the polarization multiplex receiver can receive the signals at the two polarization states of the arrived light, and the receiver comprises:

a front end, with the function to convert the input optical signal 2201 into baseband signals 2212 and 2213 at the two polarization states, with the two polarization states comprising a vertical polarization state (V-polarization state) and a horizontal polarization state (H-polarization state) in this embodiment.

As shown in FIG. 22, the optical signal is converted into a baseband signal at one polarization state after passing through the optical 90 deg hybrid 2202, the optoelectronic detectors 2203, 2205, and the analog-to-digital converters 2204, 2206; and the optical signal is converted into a baseband signal at another polarization state after passing through the optical 90 deg hybrid 2202, the optoelectronic detectors 2207, 2209, and the analog-to-digital converters 2209, 2210, with the procedure being similar to that in the prior art, which shall not be described further.

In addition, the receiver further comprises:

a self-phase modulation noise elimination unit 2214□ an equalization and polarization demultiplexer 2215, digital phase recovery units 2216 and 2217, and data recovery units 2218 and 2219, with their functions being similar to those at the single-polarization state and known with reference to the above documentation, which shall not be described further.

It can be seen from the above embodiments that when the self-phase modulation noise at a certain instant is calculated, not only the signal power at this instant, but the signal powers at a plurality of digital sampling periods before and after this instant are also considered and in this way, the granularity of the sub-spans may be ensured to be relatively large with a certain precision, thereby lowering the complexity of the calculation of the self-phase modulation.

In addition, when the above manner of modulation is applied to the apparatus for self-phase modulation elimination in an optical coherent receiver, since the effect of the accumulated changes in dispersion on the self-phase modulation are absorbed into the weighted values, the calculation of the self-phase modulation may be performed at a relatively large granularity, and the cascade number of the electric dispersion compensation modules in the apparatus for self-phase modulation elimination may be much less than that in the prior art.

The above apparatus and methods may be carried out in hardware, and cal also be carried in a combination of hardware and software. The present invention relates to such a computer-readable program that when the program is executed by a logic component, the logic component may be enabled to carry out the apparatus or constitutional components as described above, or the logic component is be enabled to carry out the methods or steps as described above. The present invention also relates to a storage medium storing the above program, such a hard disc, a floppy disc, a compact disc, a DVD, or a flash memory, etc.

The present invention are described above in conjunction with the embodiments, however, it will be apparent to those skilled in the art that such description are exemplary only and are not limitative to the protection scope of the present invention. Various variations and modifications may be made by those skilled in the art without departing from the spirits and principle of the present invention, which will fall into the protection scope of the present invention.

As to the embodiments containing the above examples, the following supplements are also disclosed.

(Supplement 1) Apparatus for self-phase modulation noise calculation, wherein the apparatus comprises:

a signal receiver to receive an input signal;

a calculator connected to the signal receiver to calculate a self-phase modulation noise at the current instant by using the signal powers of an input signal waveform at the current instant and at several sampling instants adjacent to the current instant.

(Supplement 2) The apparatus according to claim 1, wherein the calculating unit comprises:

a power calculator to calculate the signal powers of a received input signal waveform at the current instant and at several sampling instants adjacent to the current instant;

a weighted average calculator to weighted average the signal powers at the current instant and at several sampling instants adjacent to the current instant calculated by the power calculator;

a noise calculator to multiply the weighted averaged signal power calculated by the weighted average calculator by a predetermined factor and convert into a complex form, to obtain the self-phase modulation noise at the current instant in complex form.

(Supplement 3) The apparatus according to claim 2, wherein the weighted average calculator uses the following formula in calculation:

$$p_t = \sum_{i=-k}^{i=+k} w_i p(t - i \times T);$$

the noise calculator adopts the following formula to obtain the self-phase modulation noise at the current instant in complex form:

$$spm_t = e^{j\gamma NL \times p_t};$$

where, $w_i$ represents the weighted values for weighted averaging, which are a group of real numbers, representing the correlation degree of the signal power at adjacent instants and the self-phase modulation noise at the current instant; t represents the current instant; i represents the ith adjacent instant of the current instant, wherein $-k \leq i \leq k$, and k is a positive integer; T represents the digital sampling period of a signal; p(t−i×T) represents the power signal at the sampling instant of (t−i×T); and $\gamma_{NL}$ represents the predetermined factor, which is a nonlinear factor of an optical fiber.

(Supplement 4) The apparatus according to claim 3, wherein the apparatus further comprises a weighted value acquiring unit, the weighted value acquiring unit being used for acquiring the weighted value $w_i$ sequences by monitoring the correlation degree in time domain of the self-phase modulation noise and the signals at adjacent instants; or used for acquiring the weighted value $w_i$ sequences by the procedure of seriatim assuming one or more of the weighted values $w_i$, and seriatim determining several times the value corresponding to the optimal performance of the equipment used in the apparatus; or used for acquiring the weighted value $w_i$ sequences by assuming the functions that the weighted value $w_i$ sequences satisfy and altering the factors of the functions to determine the factor corresponding to the optimal performance of the equipment used in the apparatus; or used for acquiring the weighted value $w_i$ sequences by assuming the forms of the weighted value $w_i$ sequences and acquiring the weighted value $w_i$ sequences according to the assumed forms.

(Supplement 5) The apparatus according to claim 4, wherein when the weighted value acquiring unit is used for acquiring the weighted value $w_i$ sequences by monitoring the correlation degree in time domain of the self-phase modulation noise and the signals at adjacent instants, the weighted value acquiring unit comprises:

a first receiver to receive a signal containing a self-phase modulation noise, the signal containing a self-phase modulation noise being a single-polarization signal or a dual-polarization signal;

a first deciding unit to decide the data of the signal received by the first receiver to acquire a signal containing no self-phase modulation noise;

a first calculator to calculate the weighted value sequences by using the signal received by the first receiver, the signal acquired through the data decision by the first deciding unit, and the signals at instants i and i+N before the current instant;

wherein N is a predetermined integer greater than or equal to zero, or greater than or equal to 1.

(Supplement 6) The apparatus according to claim 5, wherein when the signal received by the first receiver is a single-polarization signal, the first calculator adopts the following formula to calculate the weighted value $w_i$ sequences:

$$w_i = \text{abs}\left[E\left\{\frac{R(t)-S(t)}{S(t-iT)} \times conj\left(\frac{R(t)-S(t)}{S(t-iT-NT)}\right)\right\}\right];$$

where, R(t) represents the signal containing a self-phase modulation noise; S(t) represents the signal acquired through the data decision of R(t); S(t−iT) represents the signal at an instant i before the current instant; and S(t−iT−NT) represents the signal at an instant i+N before the current instant, with N≥1;

when the signal received by the first receiver is a dual-polarization signal, the first calculation unit uses the following formula to calculate the weighted value $w_i$ sequences:

$$w_i = \text{abs}\left[E\left\{\frac{R_h(t)-S_h(t)}{S_h(t-iT)} \times conj\left(\frac{R_v(t)-S_v(t)}{S_v(t-iT-NT)}\right)\right\}\right];$$

where, $R_h(t)$ and $R_v(t)$ represent respectively the signals containing a self-phase modulation noise in two polarization states; $S_h(t)$ and $S_v(t)$ represent respectively the signals acquired through the data decision of $R_h(t)$ and $R_v(t)$; $S_h(t-iT)$ represents the signal at an instant i before the current instant; and $S_v(t-iT-NT)$ represents the signal at an instant i+N before the current instant, with N≥0.

(Supplement 7) Apparatus for self-phase modulation noise elimination, wherein the apparatus comprises:

a signal receiver to receive a baseband electric signal;

a noise eliminating unit to process the received baseband electric signal step by step to eliminate an adaptive modulation noise; wherein in each step of the processing, the signal powers, at the current instant and at several sampling instants adjacent to the current instant, of the electrically dispersion compensated signal waveform in the current step, is used to calculate the self-phase modulation noise at the current instant and obtain the inverse number of the self-phase modulation noise, and the inverse number of the self-phase modulation noise is converted into a complex form, which is multiplied by the electrically dispersion compensated signal waveform in the current step to eliminate the self-phase modulation noise in the current step; and a signal transmitter to transmit the signal being processed by the noise eliminating unit.

(Supplement 8) The apparatus according to claim 7, wherein the noise eliminating unit comprises a multi-cascade signal processor, and wherein the signal processor of each cascade comprises:

an electric dispersion compensator to electrically compensate the dispersion of the received signal;

a power calculator to calculate the signal powers at the current instant and at several sampling instants adjacent to the current instant according to the signal waveform electrically dispersion compensated by the electric dispersion compensator;

a weighted average calculator to weighted average the signal powers at the current instant and at several sampling instants adjacent to the current instant calculated by the power calculator;

a complex phase generator to multiply the weighted averaged signal power obtained by the weighted average calculator by a predetermined factor and invert it to obtain the inverse number of the self-phase modulation noise, and complexly convert the inverse number of the self-phase modulation noise to obtain a complex form of the inverse number of the value of self-phase modulation noise at the current instant; and a multiplier to multiply the inverse number of the value of the self-phase modulation noise in complex form generated by the complex phase generator by the signal waveform being compensated by the electric dispersion compensator to eliminate the self-phase modulation noise at the current cascade.

(Supplement 9) The apparatus according to claim 8, wherein the weighted average calculator adopts the following formula in calculation:

$$p_t = \sum_{i=-k}^{i=+k} w_i p(t-i \times T)\square$$

the complex phase generator adopts the following formula to calculate the complex form of the inverse number of the self-phase modulation noise at the current instant: $e^{j\gamma_{NL} \times p_t}$ where, $w_i$ represents the weighted values for weighted averaged, which are a group of real numbers, representing the correlation degree of the signal powers at adjacent instants and the self-phase modulation noise at the current instant; t represents the current instant; i represents the ith adjacent instant of the current instant, wherein $-k \leq i \leq k$, and k is a positive integer; T represents the digital sampling period of a signal; $p(t-i \times T)$ represents the power signal at the sampling instant of $(t-i \times T)$; and $\gamma_{NL}$ represents the predetermined factor, which is a nonlinear factor of an optical fiber.

(Supplement 10) An optical coherent receiver, where the optical coherent receiver comprises the apparatus for self-phase modulation noise elimination as claimed in any of claims 7-9.

(Supplement 11) A method for self-phase modulation noise calculation, wherein the method comprises:

receiving an input signal;

calculating a self-phase modulation noise at the current instant by using the signal powers of an input signal waveform at the current instant and at several sampling instants adjacent to the current instant.

(Supplement 12) The method according to claim 11, wherein the calculating a self-phase modulation noise at the current instant by using the signal powers of an input signal waveform at the current instant and at several sampling instants adjacent to the current instant comprises:

calculating the signal powers of a received input signal waveform at the current instant and at several sampling instants adjacent to the current instant;

weighted averaging the calculated signal powers at the current instant and at several sampling instants adjacent to the current instant;

multiplying the weighted averaged signal powers by a predetermined factor and converting into a complex form, to obtain the self-phase modulation noise at the current instant in complex form.

(Supplement 13) The method according to claim 12, wherein the weighted averaging the calculated signal powers at the current instant and at several sampling instants adjacent to the current instant uses the following formula in calculation:

$$p_t = \sum_{i=-k}^{i=+k} w_i p(t - i \times T);$$

the following formula is adopted to obtain the self-phase modulation noise at the current instant in complex form:

$$spm_t = e^{j \gamma_{NL} \times p_t};$$

where, $w_i$ represents the weighted values for weighted averaging, which are a group of real numbers, representing the correlation degree of the signal power at adjacent instants and the self-phase modulation noise at the current instant; t represents the current instant; i represents the ith adjacent instant of the current instant, wherein $-k \leq i \leq k$, and k is a positive integer; T represents the digital sampling period of a signal; $p(t-i \times T)$ represents the power signal at the sampling instant of $(t-i \times T)$; and $\gamma_{NL}$ represents the predetermined factor, which is a nonlinear factor of an optical fiber.

(Supplement 14) The method according to claim 13, wherein the method further comprises:

acquiring the weighted value $w_i$ sequences by monitoring the correlation degree in time domain of the self-phase modulation noise and the signals at adjacent instants; or acquiring the weighted value $w_i$ sequences by the procedure of seriatim assuming one or more of the weighted values $w_i$, and seriatim determining several times the value corresponding to the optimal performance of the equipment used in the apparatus; or acquiring the weighted value $w_i$ sequences by assuming the functions that the weighted value $w_i$ sequences satisfy and altering the factors of the functions to determine the factor corresponding to the optimal performance of the equipment used in the apparatus; or acquiring the weighted value $w_i$ sequences by assuming the forms of the weighted value $w_i$ sequences and acquiring the weighted value $w_i$ sequences according to the assumed forms.

(Supplement 15) The method according to claim 14, wherein when the weighted value $w_i$ sequences are acquired by monitoring the correlation degree in time domain of the self-phase modulation noise and the signals at adjacent instants, the method comprises:

receiving a signal containing a self-phase modulation noise, the signal containing a self-phase modulation noise being a single-polarization signal or a dual-polarization signal;

deciding the data of the received signal to acquire a signal containing no self-phase modulation noise;

calculating the weighted value sequences by using the received signal, the signal acquired through the data decision, and the signals at instants i and i+N before the current instant;

(Supplement 16) The method according to claim 15, wherein when the signal received by the first receiving unit is a single-polarization signal, the first calculating unit adopts the following formula to calculate the weighted value $w_i$ sequences:

$$w_i = \text{abs}\left[E\left\{\frac{R(t) - S(t)}{S(t - iT)} \times conj\left(\frac{R(t) - S(t)}{S(t - iT - NT)}\right)\right\}\right];$$

where, $R(t)$ represents the signal containing a self-phase modulation noise; $S(t)$ represents the signal acquired through the data decision of $R(t)$; $S(t-iT)$ represents the signal at an instant i before the current instant; and $S(t-iT-NT)$ represents the signal at an instant i+N before the current instant, with $N \geq 1$;

when the signal received by the first receiving unit is a dual-polarization signal, the following formula is used to calculate the weighted value $w_i$ sequences:

$$w_i = \text{abs}\left[E\left\{\frac{R_h(t) - S_h(t)}{S_h(t - iT)} \times conj\left(\frac{R_v(t) - S_v(t)}{S_v(t - iT - NT)}\right)\right\}\right];$$

where, $R_h(t)$ and $R_v(t)$ represent respectively the signals containing a self-phase modulation noise in two polarization states; $S_h(t)$ and $S_v(t)$ represent respectively the signals acquired through the data decision of $R_h(t)$ and $R_v(t)$; $S_h(t-iT)$ represents the signal at an instant i before the current instant; and $S_v(t-iT-NT)$ represents the signal at an instant i+N before the current instant, with $N \geq 0$.

(Supplement 17) A method for self-phase modulation noise elimination, wherein the method comprises:

receiving a baseband electric signal;

processing the received baseband electric signal step by step to eliminate an adaptive modulation noise; wherein in each step of the processing, the signal powers, at the current instant and at several sampling instants adjacent to the current instant, of the electrically dispersion compensated signal waveform in the current step, is used to calculate the self-phase modulation noise at the current instant and obtain the inverse number of the self-phase modulation noise, and the inverse number of the self-phase modulation noise is converted into a complex form, which is multiplied by the electrically dispersion compensated signal waveform in the current step to eliminate the self-phase modulation noise in the current step; and transmitting the signal of which the adaptive modulation noise is eliminated.

(Supplement 18) The method according to claim 17, wherein in each cascade of the processing, the method comprises:

compensating electrically the dispersion of the received signal;

calculating the signal powers at the current instant and at several sampling instants adjacent to the current instant according to the electrically dispersion compensated signal waveform;

weighted averaging the calculated signal powers at the current instant and at several sampling instants adjacent to the current instant;

multiplying the weighted averaged signal power by a predetermined factor and inverting it to obtain the inverse number of the self-phase modulation noise, and complexly converting the inverse number of the self-phase modulation noise to obtain a complex form of the inverse number of the value of self-phase modulation noise at the current instant; and multiplying the generated inverse number of the value of the self-phase modulation noise in complex form by the signal waveform being compensated by the electric dispersion compensation unit to eliminate the self-phase modulation noise at the current cascade.

(Supplement 19) The method according to claim 18, wherein in weighted averaging the calculated signal powers at the current instant and at several sampling instants adjacent to the current instant, the following formula is adopted in calculation:

$$P_t = \sum_{i=-k}^{i=+k} w_i p(t - i \times T);$$

the following formula is adopted to calculate the complex form of the inverse number of the self-phase modulation noise at the current instant: $e^{-j\gamma_{NL} \times P_t}$;

where, $w_i$ represents the weighted values for weighted averaged, which are a group of real numbers, representing the correlation degree of the signal powers at adjacent instants and the self-phase modulation noise at the current instant; t represents the current instant; i represents the ith adjacent instant of the current instant, wherein $-k \leq i \leq k$, and k is a positive integer; T represents the digital sampling period of a signal; $p(t-i \times T)$ represents the power signal at the sampling instant of $(t-i \times T)$; and $\gamma_{NL}$ represents the predetermined factor, which is a nonlinear factor of an optical fiber.

The invention claimed is:

1. An apparatus for self-phase modulation noise reduction, wherein the apparatus comprises:
    a signal receiver to receive a baseband electric signal;
    a processor to process the received electric signal step by step to reduce the self-phase modulation noise in propagation of an optical signal corresponding to the received electric signal;

wherein in each step of the processing, a weighted average of the signal power, at the current instant and at several sampling instants adjacent to the current instant, of an electrically dispersion compensated signal waveform in current step, is used to calculate the self-phase modulation noise at the current instant and obtain an estimate of the inverse number of the self-phase modulation noise, and the estimate of the inverse number of the self-phase modulation noise is used to reduce the self-phase modulation noise in the current step by applying the mathematical operation that is equivalent to converting the estimate of the inverse number of the self-phase modulation noise into a complex form and then multiplying the complex form to the electrically dispersion compensated signal waveform in the current step;

a signal transmitter to transmit the signal being processed by the processor.

2. The apparatus according to claim 1, wherein processor comprises a multi-cascade signal processor, and wherein the signal processor of each step comprises:

an electric dispersion compensator electrically to compensate the dispersion of the received signal;
    a power calculator to calculate the signal power at the current instant and at several sampling instants adjacent to the current instant according to the signal waveform electrically dispersion compensated by the electric dispersion compensator;
    a weighted average calculator to weighted average the signal power at the current instant and at several sampling instants adjacent to the current instant calculated by the power calculator;
    a complex phase generator to multiply the weighted averaged signal power obtained by the weighted average calculator by a predetermined factor and inverting it to obtain the inverse number of the self-phase modulation noise, and complexly transferring the inverse number of the self-phase modulation noise to obtain a complex form of the inverse number of the value of self-phase modulation noise at the current instant; and
    a multiplier to multiply the inverse number of the value of the self-phase modulation noise in complex form generated by the complex phase generator by the signal waveform being compensated by the electric dispersion compensator to reduce the self-phase modulation noise at the current step.

3. The apparatus according to claim 2, wherein the weighted average calculator adopts the following formula in calculation:

$$p_t = \sum_{i=-k}^{i=+k} w_i p(t - i \times T);$$

the complex phase generator adopts the following formula to calculate the complex form of the inverse number of the self-phase modulation noise at the current instant: $e^{-j\gamma_{NL} \times P_t}$;

where, $w_i$ represents the weighted values for weighted averaged, which are a group of real numbers, representing the correlation degree of the signal power at adjacent instants and the self-phase modulation noise at the current instant; t represents the current instant; i represents the i th adjacent instant of the current instant, wherein $-k \leq i \leq k$, and k is a positive integer; T represents the digital sampling period of a signal; $p(t-i \times T)$ represents the power signal at the sampling instant of $(t-i \times T)$; and $\gamma_{NL}$ represents the predetermined factor, which is a nonlinear factor of an optical fiber.

4. An optical coherence receiver, wherein the optical coherence receiver comprises the apparatus for self-phase modulation noise reduction as claimed in claim 1.

5. An apparatus for self-phase modulation noise calculation, comprising:
a signal receiver to receive an input signal;
a calculator connected to the signal receiver to calculate a self-phase modulation noise at the current instant by using a weighted average of the signal power of an input signal waveform at the current instant and at several sampling instants adjacent to the current instant.

6. The apparatus according to claim 5, wherein the calculating unit comprises:
a power calculator to calculate the signal power of a received input signal waveform at the current instant and at several sampling instants adjacent to the current instant;
a weighted average calculator to weighted average the signal power at the current instant and at several sampling instants adjacent to the current instant calculated by the power calculator;
a noise calculator to multiply the weighted averaged signal power calculated by the weighted average calculator by a predetermined factor and transferring into a complex form, to obtain the self-phase modulation noise at the current instant in complex form.

7. The apparatus according to claim 6, wherein the weighted average calculator adopts the following formula in calculation:

$$p_t = \sum_{i=-k}^{i=+k} w_i p(t - i \times T);$$

the noise calculator adopts the following formula to obtain the self-phase modulation noise at the current instant in complex form:

$$spm_t = e^{j\gamma_{NL} \times p_t};$$

where, $w_i$ represents the weighted values for weighted averaging, which are a group of real numbers, representing the correlation degree of the signal power at adjacent instants and the self-phase modulation noise at the current instant; t represents the current instant; i represents the i th adjacent instant of the current instant, wherein $-k \le i \le k$, and k is a positive integer; T represents the digital sampling period of a signal; $p(t-i \times T)$ represents the power signal at the sampling instant of $(t-i \times T)$; and $\gamma_{NL}$ represents the predetermined factor, which is a nonlinear factor of an optical fiber.

8. The apparatus according to claim 7, wherein the apparatus further comprises a weighted value acquiring unit, the weighted value acquiring unit being used for acquiring the weighted value $w_i$ sequences by monitoring the correlation degree in time domain of the self-phase modulation noise and the signals at adjacent instants; or
used for acquiring the weighted value $w_i$ sequences by the procedure of seriatim assuming one or several of the weighted values $w_i$ and seriatim determining several times the value corresponding to the optimal performance of the equipment used in the apparatus; or
used for acquiring the weighted value $w_i$ sequences by assuming the functions that the weighted value $w_i$ sequences satisfy and altering the factors of the functions to determine the factor corresponding to the optimal performance of the equipment used in the apparatus; or
used for acquiring the weighted value $w_i$ sequences by assuming the forms of the weighted value $w_i$ sequences and acquiring the weighted value $w_i$ sequences according to the assumed forms.

9. The apparatus according to claim 8, wherein when the weighted value acquiring unit is used for acquiring the weighted value $w_i$ sequences by monitoring the correlation degree in time domain of the self-phase modulation noise and the signals at adjacent instants, the weighted value acquiring unit comprises:
a first receiver to receive a signal containing a self-phase modulation noise, the signal containing a self-phase modulation noise being a single-polarization signal or a dual-polarization signal;
a first deciding unit to decide the data of the signal received by the first receiver to acquire a signal containing no self-phase modulation noise;
a first calculator to calculate the weighted value sequences by using the signal received by the first receiver, the signal acquired through the data decision by the first deciding unit, and the signals at instants i and i+N before the current instant;
where, N is a predetermined integer greater than or equal to zero, or greater than or equal to 1.

10. The apparatus according to claim 9 wherein when the signal received by the first receiver is a single-polarization signal, the first calculator adopts the following formula to calculate the weighted value $w_i$ sequences:

$$w_i = \text{abs}\left[E\left\{\frac{R(t) - S(t)}{S(t - iT)} \times conj\left(\frac{R(t) - S(t)}{S(t - iT - NT)}\right)\right\}\right];$$

where, R(t) represents the signal containing a self-phase modulation noise; S(t) represents the signal acquired through the data decision of R(t); S(t−iT) represents the signal at an instant i before the current instant; and S(t−iT−NT) represents the signal at an instant i+N before the current instant, with N≥1;
when the signal received by the first receiver is a dual-polarization signal, the first calculating unit uses the following formula to calculate the weighted value $w_i$ sequences:

$$w_i = \text{abs}\left[E\left\{\frac{R_h(t) - S_h(t)}{S_h(t - iT)} \times conj\left(\frac{R_v(t) - S_v(t)}{S_v(t - iT - NT)}\right)\right\}\right];$$

where, $R_h(t)$ and $R_v(t)$ represent respectively the signals containing a self-phase modulation noise in two polarization states; $S_h(t)$ and $S_v(t)$ represent respectively the signals acquired through the data decision of $R_h(t)$ and $R_v(t)$; $S_h(t-iT)$ represents the signal at an instant i before the current instant; and $S_v(t-iT-NT)$ represents the signal at an instant i+N before the current instant, with N≥0.

* * * * *